US007853785B1

(12) United States Patent
Thurman et al.

(10) Patent No.: US 7,853,785 B1
(45) Date of Patent: Dec. 14, 2010

(54) SYSTEM AND METHOD FOR IMPLEMENTING DIGITAL CERTIFICATE REVOCATION IN AN AD-HOC NETWORK

(75) Inventors: Sally C. Thurman, Cedar Rapids, IA (US); Karl F. Hoech, Cedar Rapids, IA (US); Frank A. Hummer, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1155 days.

(21) Appl. No.: 11/223,607

(22) Filed: Sep. 9, 2005

(51) Int. Cl.
*H04L 9/00* (2006.01)
(52) U.S. Cl. .................................................. 713/158
(58) Field of Classification Search ......... 713/156–158, 713/175, 176; 380/247, 273; 726/10
See application file for complete search history.

(56) References Cited

U.S. PATENT DOCUMENTS

| 6,134,550 A * | 10/2000 | Van Oorschot et al. ......... 707/9 |
| 6,748,531 B1 * | 6/2004 | Epstein ....................... 713/158 |
| 7,181,614 B1 * | 2/2007 | Gehrmann et al. .......... 713/155 |
| 7,356,329 B2 * | 4/2008 | Willey et al. ................ 455/410 |
| 7,382,762 B2 * | 6/2008 | Chmora et al. .............. 370/342 |
| 7,581,095 B2 * | 8/2009 | Billhartz ..................... 713/168 |
| 2002/0082035 A1 | 6/2002 | Aihara et al. |
| 2005/0053045 A1 * | 3/2005 | Chmora et al. .............. 370/338 |
| 2005/0191990 A1 * | 9/2005 | Willey et al. ................ 455/411 |
| 2008/0034204 A1 * | 2/2008 | Lakshminarayanan ...... 713/158 |

OTHER PUBLICATIONS

Hadjichristofi et al., "A Framework for Key Management In Mobile Ad Hoc Networks," Information Technology: Coding and Computing, 2005, ITCC 2005, International Conference on vol. 2, Apr. 4-6, 2005 pp. 568-573.

* cited by examiner

*Primary Examiner*—Beemnet W Dada
(74) *Attorney, Agent, or Firm*—Matthew J. Evans; Daniel M. Barbieri

(57) ABSTRACT

A computer-implemented system for implementing maintenance and distribution of revocation information within an ad-hoc network. The system includes at least one network node. The network node includes a computer implemented application configured to maintain revocation information in computer memory and distribute the revocation information to other network nodes using a two stage distribution method. The distribution method includes a first stage wherein the revocation message is transmitted to all certifier nodes within the ad-hoc network, and a second stage wherein each certifier node distributes the revocation message to at least one non-certifier node associated with the certifier node.

20 Claims, 3 Drawing Sheets

SYSTEM AND METHOD FOR IMPLEMENTING DIGITAL CERTIFICATE REVOCATION IN AN AD-HOC NETWORK

GOVERNMENT LICENSE RIGHTS

The U.S. Government has a paid-up license in this invention and the right in limited circumstances to require the patent owner to license others on reasonable terms as provided for by the terms of Government Contract No. N00014-03-C-0322 awarded by the Office of Naval Research—Tactical Network Security.

BACKGROUND OF THE INVENTION

The present invention relates generally to the field of ad-hoc network implementation. More particularly, the present invention relates to systems and methods for managing digital certificate revocation for a public key infrastructure in an ad-hoc network.

An ad-hoc network is a cooperative engagement of a collection of mobile nodes without the required intervention of any centralized access point or existing infrastructure. The lack of a centralized access point or infrastructure, although increasing robustness, can create difficulties in implementing a centralized certifier hierarchy for a public key infrastructure.

In cryptography, a public key infrastructure (PKI) is an arrangement which provides for third-party vetting of, and vouching for, user identities. It also allows binding of public keys to users. This is usually carried by software at a central location together with other coordinated software at distributed locations. The public keys are typically embodied in certificates.

Traditional use of PKI assumes a fixed network architecture. In the fixed network, nodes that fill the role of certificate authority are manually paced in an organization for efficient distribution of certificates throughout the network. This distribution normally uses a single certificate authority within the network to create, distribute, and revoke certificates for all of the members of the network. Accordingly, the single certificate authority may be configured to maintain all certificate information such that each node, upon encountering a certificate, will query the certificate authority to verify the authenticity of the certificate.

Alternatively, an ad-hoc network may be configured such that each node maintains revocation information for the entire network, and the certificate network is configured to periodically transmit updated information. In this embodiment, the revocation list, and the corresponding updates can grow to be very large causing network overhead and reducing network throughput.

Both of these embodiment are dependent on maintaining error free functionality for the certificate authority. Further the certificate authority must constantly be updated to ensure that it is broadcasting the most recent revocation statuses.

Accordingly, there is a need for a system and method configured to implement maintenance and distribution of revocation information within an ad-hoc network. Yet further, there is a need for such a system and method configured to provide for multiple types of revocation information to reduce network traffic. There is further a need for such system and method wherein revocation information is distributed throughout the ad-hoc network in an efficient manner.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY OF THE INVENTION

One embodiment of the invention relates to a computer-implemented system for implementing maintenance and distribution of revocation information within an ad-hoc network. The system includes at least one network node. The network node includes a computer implemented application configured to maintain revocation information in computer memory and distribute the revocation information to other network nodes using four types of revocation message. The message types include individual revocation messages, incremental revocation messages, differential revocation messages, and cumulative revocation messages.

Another embodiment of the invention relates to a computer-implemented system for implementing maintenance and distribution of revocation information within an ad-hoc network. The system includes at least one network node. The network node includes a computer implemented application configured to maintain revocation information in computer memory and distribute the revocation information to other network nodes using a two stage distribution method. The distribution method includes a first stage wherein the revocation message is transmitted to all certifier nodes within the ad-hoc network, and a second stage wherein each certifier node distributes the revocation message to at least one non-certifier node associated with the certifier node.

Yet another embodiment of the invention relates to a computer implemented method for distribution of revocation information within an ad-hoc network. The method includes receiving a revocation message at a first certifier node within the ad-hoc network, and distributing the received revocation message to at least one non-certifier node associated with the first certifier node.

Alternative examples of other exemplary embodiments are also provided which relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
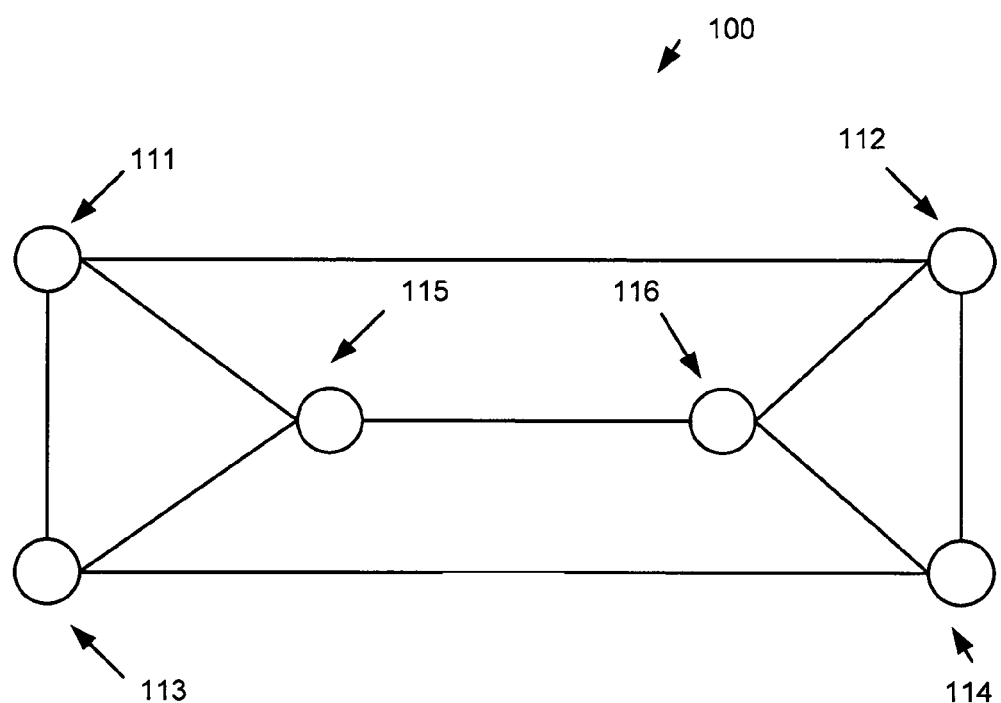
FIG. 1 is a block diagram illustrating a simple ad-hoc network, according to an exemplary embodiment.

Before describing in detail the particular improved system and method, it may be observed that the invention includes, but is not limited to, a novel structural combination of conventional data/signal processing components and communications circuits, and not in the particular detailed configurations thereof. Accordingly, the structure, methods, functions, control, and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiment depicted in the exemplary diagrams, but may be construed in accordance with the language in the claims.

Referring now to FIG. 1, a block diagram illustrating a simple ad-hoc network 100 is shown, according to an exemplary embodiment. Network 100 includes a first node 111, a second node 112, a third node 113, a fourth node 114, a fifth node 115, and a sixth node 116. Each node in the ad-hoc network may be one or more computing devices configured to communicate over the network. Each node further has a unique node id associated with it.

Embodiments of the present invention may be practiced in a networked environment using logical connections to one or more remote computing systems having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, handheld devices, multi-processor systems, microprocessor-based or programmable consumer electronics, network PC's, minicomputers, mainframe computers, and the like. Embodiments of the invention may also be practiced in distributed computing environments where tasks are performed by local and remote processing devices that are linked (either by hardwired links, wireless links or by a combination of hardwired and wireless links) through a communications network. In a distributed computing environment, program modules may be located in both local and remote memory storage devices.

According to an exemplary embodiment, network 100 may be divisible into a series of network certifier regions. Each network certifier region may be any set of nodes selected from all available nodes. For example, referring to FIG. 1, a first certifier region may include nodes 111-113 and a second certifier region may include node 114-116. The set of nodes may include all of the nodes in the ad-hoc network. The selection criteria may be defined based on any information associated with the nodes or the network. Exemplary selection criteria may include network topology, network traffic, node function, node type, predicted traffic, network address, etc.

A network certifier region may be dynamically implemented within the ad-hoc network. Each node within the network certifier region may be configured to implement a network certifier region selection algorithm based on the selection criteria defining the neighborhoods. The algorithm may be implemented based on one or more than one of the selection criteria. For example, network certifier regions may be defined based on a combination of node function and network traffic. Each node may be configured to execute the network certifier region selection algorithm based on an elapsed period and/or based on the occurrence of an event such as addition of a new node, departure of a node, a change in network traffic loads, changes in tactical needs, etc.

One type of certifier region may be a network neighborhood that includes a subset of the nodes in the ad-hoc network. A neighborhood may be defined as all of the nodes within a predetermined number of hops from a given node. A hop is a direct connection between nodes that does not require messages pass through an intermediary node. Accordingly, in a 1-hop neighborhood, every node within the neighborhood is within one hop of any other node in the neighborhood. A 1-hop neighborhood for a given node includes all nodes that are within one hop of the given node. Certifier regions may alternatively be defined according to any other criteria such as a subnet in a fixed network, nodes with a certain role or type, etc.

Figure 2:
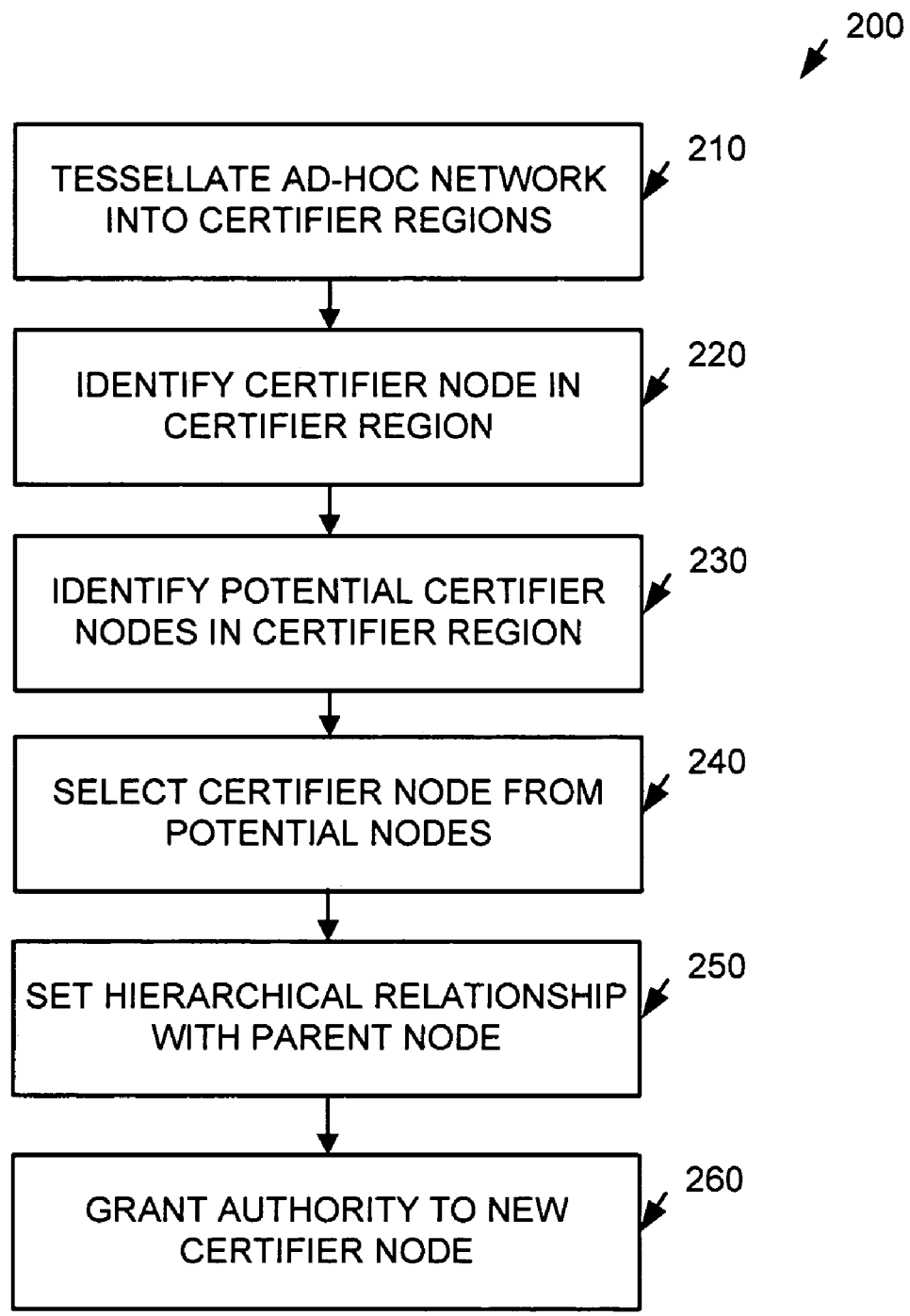
FIG. 2 is a flowchart illustrating a method for generating a hierarchical set of certifiers nodes for a public key infrastructure within an ad-hoc network, according to an exemplary embodiment.

Referring now to FIG. 2, a flowchart 200 illustrating a method for generating a hierarchical set of certifiers nodes for a public key infrastructure within an ad-hoc network is shown, according to an exemplary embodiment. After the selection criteria is selected for ad-hoc network 100, each node will execute the network certifier region selection algorithm to partition the nodes into the network certifier regions in a step 210. During partitioning, every node is partitioned into at least one certifier region. Execution of the network certifier region selection algorithm may be performed independently by each node, for example, where the selection algorithm is a node function selection algorithm, or may require intercommunication between nodes, for example, where the selection algorithm is a network traffic selection algorithm.

After nodes have been divided into network certifier regions, a determination must be made whether every network certifier region includes at least one certifier node in a step 220. The determination may be made by a root certifier node, made individually by potential certifier nodes, collectively by the certifier nodes, etc. The determination may be made based on any type of selection algorithm using any type of information available to the network nodes such as node topology, network resources, network traffic patterns, etc.

A certifier node is an entity which issues digital certificates for use by other nodes. A digital certificate uses a digital signature to bind together a public key with an identity— information such as the name of a person or an organization, their address, and so forth. The certificate can be used to verify that a public key belongs to an individual. A certifier node will issue a public key certificate which states that the certifier node attests that the public key contained in the certificate belongs to the person, organization, server, or other entity noted in the certificate. A certifier "signs" the certificate such that other nodes can examine the signature for validity.

If a network certifier region does not include a certifier node, a certifier node may be created from among the nodes in the network certifier region. Although all of the nodes may serve as certifiers, the eligibility of nodes to act as certifiers, hereinafter potential certifier nodes, is determined by policy. This potential is switched on only by existing certifiers through an update to the certificate of the newly designated potential certifier node. Potential certifier nodes within the certifier region are identified in a step 230.

After a determination has been made of the potential certifier nodes within a network certifier region, a certifier selection algorithm may be executed to select a certifier from among eligible nodes in a step 240. The certifier selection algorithm may select the certifier node based on network characteristics, potential node characteristics, or any other desired characteristic. Although at least one certifier node should be included within each network certifier region.

Upon creation, the certifier node that spawned the newly created certifier may further create a parent child relationship between the certifier node and the newly created certifier node in a step 250. The parent child relation may be created by updating the digital certificates of both the certifier node, to indicate a parent node status, and the newly created certifier node, to indicate a child node status.

The process of creating additional child nodes by a parent node may be iteratively performed as needed to create a hierarchy of certifier nodes defined by a series of parent child relationships. The hierarchical information may be stored at each certifier node. The hierarchical information may include information regarding all or any subset of the hierarchy information. For example, a certifier node may be configured to only maintain hierarchy information just for that node, i.e., related to its own parent child relationships, hierarchy information for the node's neighborhood, hierarchy information for an entire network, etc. By maintaining this information, the hierarchical structure becomes robust, even though it is not created or maintained by a root certifier.

Each newly created child certifier node may be granted up to all of the powers that are granted to the parent certifier node. Accordingly, the child certifier node may be granted less than all of the powers of the parent. For example, a parent certifier node may switch on a potential certifier node to create a certifier node, but may wish to limit the ability of the child node to switch on other certifier nodes. Accordingly, that power may be withheld from the child certifier node. The powers that are granted to a child certifier node may be defined in an update to the digital certificate of the child node in a step 260.

Advantageously, implementation of the certifier selection algorithm can greater increase the robustness of an ad-hoc network without requiring excessive redundant resources. Where the certifier nodes are created dynamically allocating memory and network bandwidth where needed, the ad-hoc network may be implemented with less consumption of resources and reduced buffer sizes.

Figure 3:
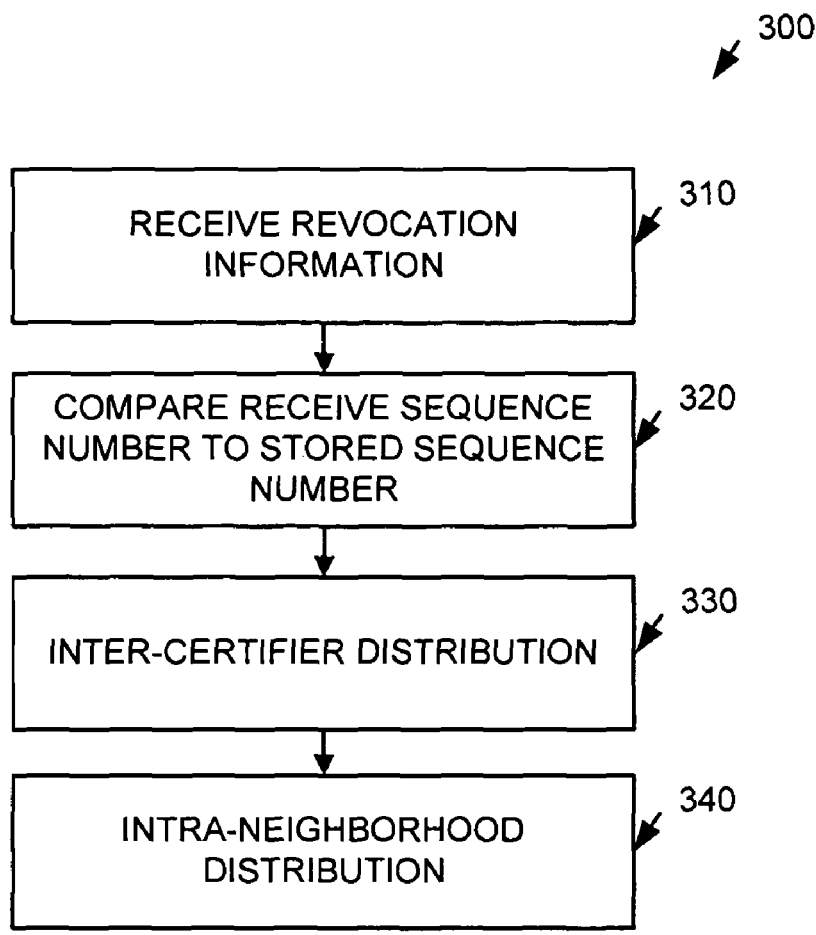
FIG. 3 is a flowchart illustrating a method for maintaining and distributing revocation information in an ad-hoc network, according to an exemplary embodiment.

Referring now to FIG. 3, a flowchart 300 illustrating a method for maintaining and distributing revocation information in an ad-hoc network is shown, according to an exemplary embodiment. Each node within the ad-hoc network may be configured to maintain revocation information. The revocation information may include all or a subset of the complete revocation information. Revocation information is received by a node in a step 310. The revocation information is processed by the node to determine how the information is used for maintenance of node revocation information and for distribution to other nodes. Maintaining and distributing revocation information may include distributing at least three different types of revocation messages. Although these message type are discussed within the context of network 100 which includes a hierarchical structure, it should be understood that the message types may equally be used within the context of any ad-hoc network.

A first type of revocation message may include an individual revocation message. This type of revocation is generally distributed based on an event such as an indication that a certificate issued to a node is invalid or should be revoked. For example, a certifier authority node or other node may determine that a node has become corrupted and shouldn't be trusted. Accordingly, the certifier authority may disseminate an individual revocation message to all of the nodes indicate that the corrupted nodes certificate is revoked. For an individual node, reinstatement and/or new certificates are similarly handled by a single message. These individual revocation and/or reinstatement messages generally only contain information related to the single event.

A second type of revocation message may include a cumulative revocation message. The cumulative revocation distribution may be either event driven or period driven. For example, a new node entering the network may request a cumulative list to have a complete listing of the revocation information. Alternatively, the cumulative list may be distributed periodically, perhaps during a time when network utilization is traditionally low. A cumulative list may include all of the revocation information for all of the nodes in the ad-hoc network.

A third type of revocation message may include a periodic revocation message that is distributed based on some defined schedule. Periodic messages are generally transmitted on the defined scheduled to maintain the stability of the ad-hoc network. Periodic messages may also be used by nodes to determine whether they have missed any previous individual and/or periodic messages. For example, each individual and/or periodic may include a sequence number, further discussed below, that can be monitored by each node to recognize missed messages.

Periodic messages may include both periodic differential messages and periodic incremental messages. A periodic differential message contains all revocation/reinstatement information that has occurred since the previous cumulative message distribution. A periodic incremental message contains all revocation/reinstatement information that has occurred since the previous message distribution of any type: cumulative, differential or incremental. Accordingly, a periodic incremental message is an aggregation of individual revocation messages that is sent on a periodic basis.

Each type of revocation message may be configured to include a sequence number to ensure continuity of messages. Upon receipt of a revocation message in step 310, each node within an ad-hoc network may be configured to compare the sequence number of a received revocation message with an expected revocation sequence number in a step 320. If the number matches, the expected revocation sequence number can be incremented and the revocation message processed. If the sequence number is not the expected revocation sequence number, the node may request re-transmission of the missing revocation number.

The implementation of the sequence number may be dependent on the type of revocation message being received. For example, sequence numbers may be implemented separately for the individual revocation and periodic-differential list messages. Further, cumulative revocation messages may be configured to contain reference to the latest periodic-differential sequence number that the cumulative list covers.

According to an exemplary embodiment, the revocation messages may be distributed in a two-stage process. In a first inter-certifier stage, revocation messages may be distributed among the certifiers in all regions in a step 330. A certifier node that determines that a certificate revocation is needed distributes the certificate revocation information to all other certifier nodes using the certifier hierarchy tree discussed above with reference to FIG. 2. In other words, each certifier node distributes the revocation information to its parent certifier and to all its children certifiers. In the second, intra-region stage, revocation messages may be distributed to the nodes within a region served by each certifier node in a step 340. Each certifier node distributes the revocation information throughout its own neighborhood using a repeated unicast, limited broadcast or multicast algorithm as appropriate for the underlying data link layer. The nodes may be configured to ignore messages that are not sent by nodes with their region. For example, if a revocation message is received by a node A in region A from a node B, that is not in the same region A, the node A ignores the message and information. Node A should receive the information from another node within its own region, thus completing the intra-region distribution of the revocation information.

Although the above methods and exemplary networks described execution of method within the context of an ad-hoc network, it should be understood that the methods and examples are equally applicable within any sub-network within the ad-hoc network.

It may be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and logic to accomplish the various database searching steps, correlation steps, comparison steps and decision steps. It may also be noted that the word "component" as used herein and in the claims is intended to encompass implementations using one or more lines of software code, and/or hardware implementations, and/or equipment for receiving manual inputs.

Embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which ca be used to carry or stored desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods described herein. The particular sequence of such executable instructions or associated data structures represent examples of corresponding acts for implementing the functions described in such steps.

While the detailed drawings, specific examples, and particular formulations given described preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communication bus or processor used may differ. The systems and methods depicted and described are not limited to the precise details and conditions disclosed. Furthermore, other substitutions, modifications, changes, and omissions may be made in the design, operating conditions, and arrangement of the exemplary embodiment without departing from the scope of the invention as expressed in the appended claims.

What is claimed is:

1. A computer-implemented system for implementing maintenance and distribution of revocation information within an ad-hoc network, comprising:

at least one network node configured to serve as a certifier node for the ad-hoc network, wherein the network node includes a computer implemented application configured to maintain revocation information in computer memory and distribute the revocation information to other network nodes using four types of revocation message, including individual revocation messages, incremental revocation messages, differential revocation messages, and cumulative revocation messages, wherein the at least one network node is further configured to determine whether a region of the ad-hoc network should be assigned another certifier node, and wherein the network node is configured to create a new certifier node and to establish a parent-child relationship between the network node and the new certifier node by updating the digital certificates of both the network node and the new certifier node to indicate the parent node status of the network node and the child node status of the new certifier node.

2. The system of claim 1, wherein the individual revocation message is transmitted based on revocation of a digital certificate by a certifier node for a single network node.

3. The system of claim 1, wherein each of the four types of revocation message is configured to include a sequence number for the revocation message.

4. The system of claim 3, wherein maintaining revocation information in computer memory includes receiving the revocation messages from other nodes and verifying the sequence number in a received revocation message.

5. The system of claim 3, wherein a sequence number for a cumulative revocation message is configured to reference a periodic-differential sequence number.

6. The system of claim 1, wherein the certifier node stores the hierarchical structure for the child parent relationship for the certifier node only.

7. The system of claim 1, wherein distribution of the revocation information to other network nodes include a two stage distribution process including a first stage wherein the revocation message is transmitted to all certifier nodes within the ad-hoc network and a second stage wherein each certifier node distributes the revocation message to at least one non-certifier node associated with the certifier node.

8. A computer-implemented system for implementing maintenance and distribution of revocation information within an ad-hoc network, comprising:

at least one network node configured to serve as a certifier node for the ad-hoc network, wherein the network node includes a computer implemented application configured to maintain revocation information in computer memory and distribute the revocation information to other network nodes using a two stage distribution method, the distribution method using three types of revocation message, including individual revocation messages, incremental revocation messages, and periodic attempt type of revocation messages, wherein the two stage distribution method includes
- a first stage wherein the revocation information is transmitted to all certifier nodes within the ad-hoc network, and
- a second stage wherein the network node distributes the revocation message to at least one non-certifier node associated with the network node, wherein node the network node stores a parent child relationship associated with a parent node of the network node, the parent node certifying the network node.

9. The system of claim 8, wherein the distribution method is configured to be utilized based on revocation of a digital certificate by a certifier node for a single network node.

10. The system of claim 8, wherein distribution of the revocation information to other network nodes include four types of revocation message, including individual revocation messages, incremental revocation messages, differential revocation messages, and cumulative revocation messages.

11. The system of claim 10, wherein each of the four types of revocation message is configured to include a sequence number for the revocation message.

12. The system of claim 11, wherein maintaining revocation information in computer memory includes receiving the revocation messages from other nodes and verifying the sequence number in a received revocation message.

13. The system of claim 11, wherein a sequence number for a cumulative revocation message is configured to reference a periodic-differential sequence number.

14. The system of claim 8, wherein the network nodes are nodes within an ad-hoc network and wherein the network nodes are configured into a plurality of certifier regions.

15. A computer implemented method for distribution of revocation information within an ad-hoc network, comprising:
- receiving a revocation message at a first certifier node within the ad-hoc network, three types of revocation message, including individual revocation messages, incremental revocation messages, and periodic attempt type of revocation messages and
- distributing the received revocation message to at least one non-certifier node associated with the first certifier node, wherein the first certifier node is further configured to determine whether a region of the ad-hoc network should be assigned another certifier node, and wherein the network node is configured to create a new certifier node and to establish a parent-child relationship between the network node and the new certifier node by updating the digital certificates of both the network node and the new certifier node to indicate the parent node status of the network node and the child node status of the new certifier node.

16. The method of claim 15, wherein the revocation message is a revocation of a digital certificate for a single network node transmitted by a second certifier node.

17. The method of claim 15, wherein received revocation message is one of four types of revocation message, including an individual revocation message, an incremental revocation message, a differential revocation message, and a cumulative revocation message.

18. The method of claim 17, wherein receiving a revocation message includes verifying the revocation message based on a sequence number contained in the revocation message.

19. The method of claim 15, wherein verifying the revocation message includes determining that a sequence number for a cumulative revocation message references a latest periodic-differential sequence number.

20. The method of claim 15, wherein distributing the received revocation message to at least one non-certifier node associated with the first certifier node includes utilizing a limited broadcast algorithm.

* * * * *